United States Patent
Suzuki et al.

(10) Patent No.: US 9,682,322 B2
(45) Date of Patent: Jun. 20, 2017

(54) SERVER DEVICE, ELECTRONIC GAME DEVICE, AND NON-TRANSITORY COMPUTER-READABLE STORAGE MEDIUM STORING ELECTRONIC GAME PROGRAM

(71) Applicant: DeNA Co., Ltd., Tokyo (JP)

(72) Inventors: Toshinori Suzuki, Tokyo (JP); Makoto Yamaguchi, Tokyo (JP); Masatoshi Inagawa, Tokyo (JP)

(73) Assignee: DENA CO., LTD., Tokyo (JP)

( * ) Notice: Subject to any disclaimer, the term of this patent is extended or adjusted under 35 U.S.C. 154(b) by 416 days.

(21) Appl. No.: 14/500,772

(22) Filed: Sep. 29, 2014

(65) Prior Publication Data

US 2015/0094145 A1    Apr. 2, 2015

(30) Foreign Application Priority Data

Sep. 30, 2013    (JP) .................................. 2013-203531

(51) Int. Cl.
*A63F 13/58*    (2014.01)
*A63F 13/56*    (2014.01)
*A63F 13/42*    (2014.01)
*A63F 13/822*    (2014.01)

(52) U.S. Cl.
CPC .............. *A63F 13/58* (2014.09); *A63F 13/42* (2014.09); *A63F 13/56* (2014.09); *A63F 13/822* (2014.09)

(58) Field of Classification Search
CPC ........ A63F 13/005; A63F 13/55; A63F 13/56; A63F 13/58; A63F 2300/65; A63F 13/822; A63F 2300/807
See application file for complete search history.

(56) References Cited

U.S. PATENT DOCUMENTS

| | | | | |
|---|---|---|---|---|
| 6,251,012 B1* | 6/2001 | Horigami | ................ | A63F 13/10 273/148 B |
| 6,273,818 B1* | 8/2001 | Komoto | ................ | A63F 13/005 463/31 |
| 2014/0094317 A1* | 4/2014 | Takagi | .................... | A63F 13/12 463/42 |

OTHER PUBLICATIONS

Sony Playstation, Final Fantasy Tactics game manual, 1997/1998.*
Grid-Based Movement Games—Giant Bomb, http://www.giantbomb.com/grid-based-movement/3015-1318/games/, copied Dec. 12, 2016.*
Japanese Patent Office Action for Japanese Patent Application No. 2013-203531, "Notification of Reasons for Refusal", mailed Dec. 17, 2013, pp. 1-7.
"iPhone AC extra report: Dungeon Raid", Jan. 29, 2011, the Internet <URL: http://iphoneac-blog.com/archives/4046364.html>.
"Cat Ninja—Android App of Google Play", May 28, 2012, the Internet <URL: https://play.google.com/store/apps/details?id=com.gclue.nekonin&hl=ja>.
"Puzzle & Dragons", Monthly App Style, Feb. 28, 2013, pp. 40-45, vol. 1, Issue 3, East Press, Inc.

* cited by examiner

*Primary Examiner* — Damon Pierce

(57) ABSTRACT

A display unit that displays a player character and a plurality of types of panels in a tile manner as a game image, and an input unit that receives an input of selecting the same type of adjacent panels of the plurality of types of panels starting from the player character as a starting point, in each turn. An effect on the game is provided according to the type of the panels, the input of which has been received in the input unit.

11 Claims, 20 Drawing Sheets

| CHARACTER TYPE | ATTACK STRENGTH | DEFENSE STRENGTH | HP | AP | ATTRIBUTE | MOVEMENT CHARACTERISTIC | ATTACK RANGE |
|---|---|---|---|---|---|---|---|
| ENEMY CHARACTER A | 1 | 1 | 5 | 0 | NO-ATTRIBUTE | ONE PANEL | ONE PANEL |
| ENEMY CHARACTER B | 3 | 3 | 7 | 1 | FIRE | ONE PANEL | ONE PANEL |
| ENEMY CHARACTER C | 5 | 5 | 10 | 2 | TREE | ONE PANEL | ONE PANEL |
| ENEMY CHARACTER C | 10 | 8 | 15 | 2 | WATER | TWO PANELS | ONE PANEL |
| ⋮ | ⋮ | ⋮ | ⋮ | ⋮ | ⋮ | ⋮ | ⋮ |
| ENEMY CHARACTER H | 50 | 48 | 30 | 5 | NO-ATTRIBUTE | ONE PANEL | TWO PANELS |

FIG. 6

| USER ID | DUNGEON | FLOOR NUMBER |
|---------|---------|--------------|
| USER 01 | A | B1F |
| USER 02 | B | B2F |
| USER 03 | A | B4F |

FIG. 7

| USER ID | PLAYER CHARACTER TYPE | LEVEL | NUMBER OF REMAINING TURNS | REMAINING HP | REMAINING AP | JOB | COORDINATE VALUES | EQUIPMENT |
|---|---|---|---|---|---|---|---|---|
| USER 01 | FIGHTER | 1 | 10 | 25 | 5 | CHARACTERISTIC A | (2, 4) | WEAPON A, PROTECTIVE GUARD A, RECOVERY AGENT, BOMB |
| USER 02 | WIZARD | 3 | 8 | 20 | 10 | CHARACTERISTIC C | (1, 1) | WEAPON C, PROTECTIVE GUARD C, RECOVERY AGENT |
| USER 03 | FIGHTER | 5 | 12 | 30 | 12 | CHARACTERISTIC B | (4, 3) | PROTECTIVE GUARD E |

FIG. 8

| USER ID | EQUIPMENT | ITEM |
|---|---|---|
| USER 01 | WEAPON A, WEAPON B, PROTECTIVE GUARD A, PROTECTIVE GUARD B, ... | RECOVERY AGENT, BOMB, ANTIDOTE, ... |
| USER 02 | WEAPON C, WEAPON D, PROTECTIVE GUARD C, PROTECTIVE GUARD D, ... | ANTIDOTE, RING, ... |
| USER 03 | WEAPON E, PROTECTIVE GUARD E, PROTECTIVE GUARD F, ... | |

FIG. 10

USER ID: 01

| COORDINATE VALUES | CONTENT |
|---|---|
| (1, 1) | ATTACK PANEL 32a |
| (1, 2) | ATTACK PANEL 32b |
| (1, 3) | ATTACK PANEL 32d |
| (1, 4) | ATTACK PANEL 32a |
| (1, 5) | ATTACK PANEL 32c |
| (2, 1) | RECOVERY PANEL 34 |
| (2, 2) | RECOVERY PANEL 34 |
| (2, 3) | ATTACK PANEL 32c |
| (2, 4) | PLAYER CHARACTER 30 |
| (2, 5) | ATTACK PANEL 32b |
| ⋮ | ⋮ |
| (6, 1) | ATTACK PANEL 32a |
| (6, 2) | ATTACK PANEL 32d |
| (6, 3) | RECOVERY PANEL 34 |
| (6, 4) | ATTACK PANEL 32a |
| (6, 5) | ATTACK PANEL 32c |

FIG. 11

| CHARACTER TYPE | ATTACK STRENGTH | DEFENSE STRENGTH | HP | AP | ATTRIBUTE | MOVEMENT CHARACTERISTIC | ATTACK RANGE |
|---|---|---|---|---|---|---|---|
| ENEMY CHARACTER A | 1 | 1 | 5 | 0 | NO-ATTRIBUTE | ONE PANEL | ONE PANEL |
| ENEMY CHARACTER B | 3 | 3 | 7 | 1 | FIRE | ONE PANEL | ONE PANEL |
| ENEMY CHARACTER C | 5 | 5 | 10 | 2 | TREE | ONE PANEL | ONE PANEL |
| ENEMY CHARACTER C | 10 | 8 | 15 | 2 | WATER | TWO PANELS | ONE PANEL |
| ...... | ...... | ...... | ...... | ...... | ...... | ...... | ...... |
| ENEMY CHARACTER H | 50 | 48 | 30 | 5 | NO-ATTRIBUTE | ONE PANEL | TWO PANELS |

FIG. 12

TYPE OF DUNGEON: A
FLOOR NUMBER: B1F
TOTAL NUMBER OF ENEMY CHARACTERS: 2

| PANEL TYPE | OCCURRENCE PERCENTAGE |
|---|---|
| ENEMY CHARACTER A | 50% |
| ENEMY CHARACTER B | 20% |
| ENEMY CHARACTER C | 10% |
| ENEMY CHARACTER D | 5% |
| ⋮ | ⋮ |
| ENEMY CHARACTER H | 1% |

TYPE OF DUNGEON: A
FLOOR NUMBER: B2F
TOTAL NUMBER OF ENEMY CHARACTERS: 3

| ENEMY CHARACTER TYPE | OCCURRENCE PERCENTAGE |
|---|---|
| ENEMY CHARACTER A | 30% |
| ENEMY CHARACTER B | 50% |
| ENEMY CHARACTER C | 15% |
| ENEMY CHARACTER D | 8% |
| ⋮ | ⋮ |
| ENEMY CHARACTER H | 2% |

FIG. 13

| CHARACTER TYPE | HP | AP | COORDINATE VALUES |
|---|---|---|---|
| ENEMY CHARACTER A | 5 | 0 | (4, 4) |
| ENEMY CHARACTER B | 5 | 0 | (4, 5) |

FIG. 14

TYPE OF DUNGEON: A
FLOOR NUMBER: B1F
TOTAL NUMBER OF ATTACK PANELS: 18

| PANEL TYPE | OCCURRENCE PERCENTAGE | ATTRIBUTE |
|---|---|---|
| ATTACK PANEL 32a | 50% | NO-ATTRIBUTE |
| ATTACK PANEL 32b | 20% | FIRE |
| ATTACK PANEL 32c | 20% | TREE |
| ATTACK PANEL 32d | 20% | WATER |

TYPE OF DUNGEON: A
FLOOR NUMBER: B1F
TOTAL NUMBER OF ATTACK PANELS: 20

| PANEL TYPE | OCCURRENCE PERCENTAGE | ATTRIBUTE |
|---|---|---|
| ATTACK PANEL 32a | 50% | NO-ATTRIBUTE |
| ATTACK PANEL 32b | 20% | FIRE |
| ATTACK PANEL 32c | 10% | TREE |
| ATTACK PANEL 32d | 5% | WATER |

FIG. 18

| EFFECT ON GAME | CHOICES | NECESSARY AP |
|---|---|---|
| RECOVER REMAINING HP OF PLAYER CHARACTER | HP RECOVERY | 2 |
| INCREASE ATTACK STRENGTH OF PLAYER CHARACTER | ATTACK STRENGTH up | 2 |
| INCREASE DEFENSE STRENGTH OF PLAYER CHARACTER | DEFENSE STRENGTH up | 2 |
| PROVIDE DAMAGE TO ENTIRE ENEMY CHARACTERS | ENTIRE ATTACK | 4 |
| DECREASE ATTACK STRENGTH OF ENEMY CHARACTER | ENEMY ATTACK STRENGTH down | 3 |
| DECREASE DEFENSE STRENGTH OF ENEMY CHARACTER | ENEMY DEFENSE STRENGTH down | 3 |
| ⋮ | ⋮ | ⋮ |

FIG. 19

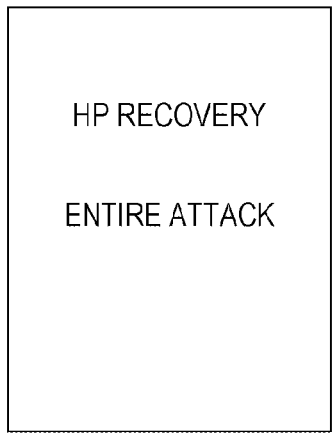

220

HP RECOVERY

ENTIRE ATTACK

FIG. 21

| EFFECT ON GAME | CHOICES |
|---|---|
| RECOVER REMAINING HP OF PLAYER CHARACTER | RECOVERY AGENT |
| INCREASE ATTACK STRENGTH OF PLAYER CHARACTER | STAMINA AGENT |
| INCREASE DEFENSE STRENGTH OF PLAYER CHARACTER | BARRIER |
| INCREASE DEFENSE STRENGTH OF PLAYER CHARACTER | ANTIDOTE |
| PROVIDE DAMAGE TO ENTIRE ENEMY CHARACTERS | BOMB |
| DECREASE ATTACK STRENGTH OF ENEMY CHARACTER | NUMBING AGENT |
| DECREASE DEFENSE STRENGTH OF ENEMY CHARACTER | SLEEPING AGENT |
| INCREASE NUMBER OF TURNS | RING |
| ⋮ | ⋮ |

FIG. 22

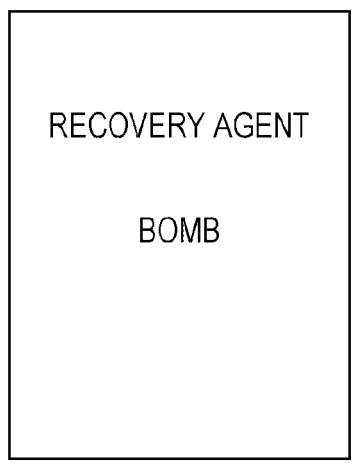

FIG. 23

| EQUIPMENT | NUMBER OF CONTINUOUSLY SELECTED ATTACK PANELS | | | | | | |
|---|---|---|---|---|---|---|---|
| | 1 TO 9 | 10 TO 14 | 15 TO 17 | 17 TO 19 | 20 TO 23 | 24 TO 29 | |
| WEAPON A | 5% | 4% | 2% | 0% | 0% | 0% | ····· |
| WEAPON B | 2% | 6% | 5% | 2% | 0% | 0% | ····· |
| ····· | ····· | ····· | ····· | ····· | ····· | ····· | |
| WEAPON Z | 0% | 0% | 0% | 2% | 5% | 15% | ····· |
| PROTECTIVE GUARD A | 5% | 4% | 2% | 0% | 0% | 0% | ····· |
| PROTECTIVE GUARD B | 2% | 6% | 5% | 2% | 0% | 0% | ····· |
| ····· | ····· | ····· | ····· | ····· | ····· | ····· | |
| PROTECTIVE GUARD Z | 0% | 0% | 0% | 2% | 5% | 15% | ····· |
| RECOVERY AGENT | 50% | 45% | 40% | 10% | 10% | 5% | ····· |
| STAMINA AGENT | 10% | 8% | 5% | 2% | 2% | 0% | ····· |
| BARRIER | 5% | 8% | 12% | 10% | 10% | 5% | ····· |
| ····· | ····· | ····· | ····· | ····· | ····· | ····· | |

SERVER DEVICE, ELECTRONIC GAME DEVICE, AND NON-TRANSITORY COMPUTER-READABLE STORAGE MEDIUM STORING ELECTRONIC GAME PROGRAM

BACKGROUND OF THE INVENTION

Field of the Invention

The present invention relates to a server device, an electronic game device, and an electronic game program that make progress with selection of panels.

Description of Related Art

An electronic game that displays a game image in which a plurality of types of panels are arranged in a tile manner, and provides an effect on the game by tracing of the same type of panels has been proposed (see https://itunes.apple.com/jp/app/dungeon-raid/id403090531?mt=8).

SUMMARY OF THE INVENTION

In a conventional electronic game, a player character is not displayed on the game image. Therefore, the game gives a player (user) an impression of simply solving a puzzle, and it is difficult for the player (user) to be emotionally involved in the game.

An objective of the present invention is to provide an electronic game having more enjoyment and strategic characteristics, the electronic game making progress with selection of panels.

One aspect of the present invention is a server device that includes a game image generation unit that generates a player character and a plurality of types of panels in a tile manner as a game image, and in each turn, receives an input of selecting the same type of adjacent panels of the plurality of types of panels starting from the player character as a starting point and provides an effect on the game according to the selected type of panels.

Here, it is favorable to provide the effect on the game according to the number of continuously selected panels.

Further, it is favorable that the game image generation unit further generates the game image including an enemy character, and provides damage to the enemy character that is further selected after the panels are selected.

Further, it is favorable to enable panels to be further selectable after the enemy character is selected, and to provide damage to another enemy character selected afterward, when a predetermined condition is satisfied.

Further, it is favorable that an attribute is provided to the panels and the enemy character, and the damage is provided to the enemy character according to a relationship between the attribute of the selected panels and the attribute of the selected enemy character.

Further, it is favorable to move the enemy character on the game image in each turn, and to provide damage to the player character according to a relative positional relationship between the player character and the enemy character.

Another aspect of the present invention is an electronic game device that includes a display unit that displays a player character and a plurality of types of panels in a tile manner, and an input unit that receives an input of selecting the same type of adjacent panels of the plurality of types of panels starting from the player character as a starting point, in each turn, and provides an effect on the game according to the type of panels, the input of which has been received by the input unit.

Another aspect of the present invention is a non-transitory computer-readable storage medium storing an electronic game program that causes a computer to function as a display unit that displays a player character and a plurality of types of panels in a tile manner, an input unit that receives an input of selecting the same type of adjacent panels in at least one of vertical, horizontal, and diagonal directions, of the plurality of types of panels, starting from the player character as a starting point, in each turn, and an effect providing unit that provides an effect on the game according to the type of panels, the input of which has been received by the input unit.

Here, it is favorable to provide the effect on the game according to the number of continuously selected panels in the input unit.

Further, it is favorable that the display unit displays an enemy character on the game image, and provides damage to the enemy character further selected after the panels are selected in the input unit.

Further, it is favorable to enable a panel to be selectable after the enemy character is selected, and to provide damage to another enemy character selected afterward when a predetermined condition is satisfied in the input unit.

Further, it is favorable that an attribute is provided to the panels and the enemy character, and the damage is provided to the enemy character according to a relationship between the attribute of the panels and the attribute of the enemy character, the inputs of which have been received in the input unit.

Further, it is favorable to move the enemy character on the game image in each turn, and to provide damage to the player character according to a relative positional relationship between the player character and the enemy character.

According to the present invention, an electronic game having more enjoyment and strategic characteristics can be provided, the electronic game making progress with selection of panels.

BRIEF DESCRIPTION OF THE DRAWINGS

FIG. 6 is a diagram illustrating a registration example of a stage database in the embodiment of the present invention;

FIG. 7 is a diagram illustrating a registration example of a player character database in the embodiment of the present invention;

FIG. 8 is a diagram illustrating a registration example of an equipment item database in the embodiment of the present invention;

FIG. 10 is a diagram illustrating a registration example of a panel arrangement database in the embodiment of the present invention;

FIG. 11 is a diagram illustrating a registration example of an enemy character database in the embodiment of the present invention;

FIG. 12 is a diagram illustrating a registration example of an enemy character arrangement database in the embodiment of the present invention;

FIG. 13 is a diagram illustrating a registration example of an enemy character status database in the embodiment of the present invention;

FIG. 14 is a diagram illustrating a registration example of an attack panel database in the embodiment of the present invention;

FIG. 18 is a diagram illustrating a registration example of an AP database in the embodiment of the present invention;

FIG. 19 is a diagram illustrating a display example of an AP menu image in the embodiment of the present invention;

FIG. 21 is a diagram illustrating a registration example of an item database in the embodiment of the present invention;

FIG. 22 is a diagram illustrating a display example of an item menu image in the embodiment of the present invention;

FIG. 23 is a diagram illustrating a registration example of a treasure box database in the embodiment of the present invention.

DETAILED DESCRIPTION OF THE INVENTION

Figure 1:
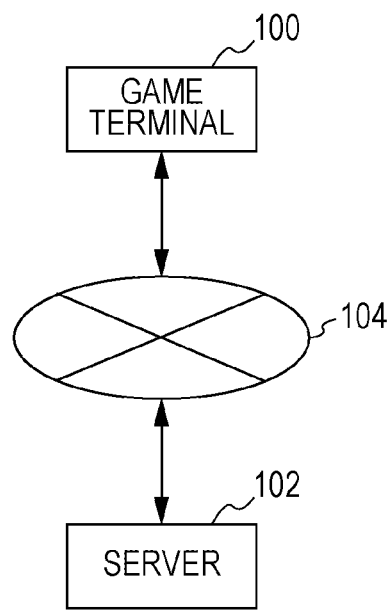
FIG. 1 is a diagram illustrating a configuration of an electronic game system in an embodiment of the present invention.

An electronic game system in an embodiment of the present invention is configured from a game terminal 100 and a server 102 as illustrated in FIG. 1. The game terminal 100 and the server 102 are connected to mutually exchange information through an information network 104, such as the Internet.

Figure 2:
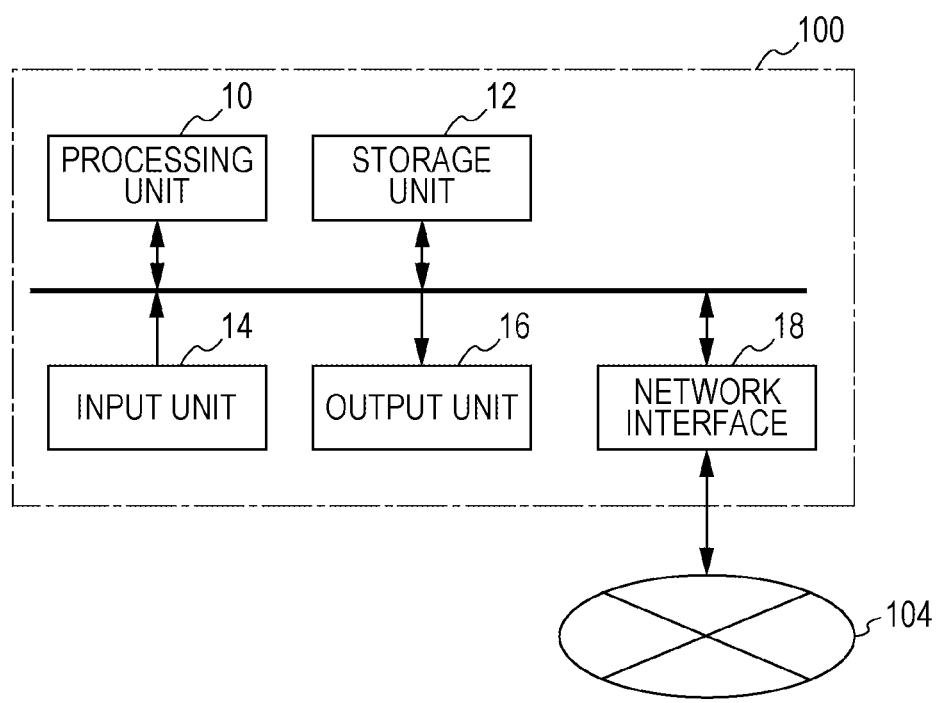
FIG. 2 is a diagram illustrating a configuration of a game terminal in the embodiment of the present invention.

The game terminal 100 is configured from, as illustrated in FIG. 2, a processing unit 10, a storage unit 12, an input unit 14, an output unit 16, and a network interface 18. That is, the game terminal 100 includes a basic configuration of a computer, and can be a typical PC, smart phone, tablet, or mobile phone.

The processing unit 10 includes a unit to perform calculation processing, such as a CPU. The processing unit 10 executes an electronic game program (regardless of a web application or a native application) stored in the storage unit 12, thereby to realize the electronic game processing in the present embodiment. The storage unit 12 includes a storage unit, such as a semiconductor memory or a hard disk. The storage unit 12 is accessibly connected with the processing unit 10, and stores an electronic game program, information necessary in an electronic game, input information input from a user, and the like. The input unit 14 includes a unit that inputs information to the game terminal 100. The input unit 14 includes a touch panel, an operation button, a keyboard that receive an input from the user, and the like. The output unit 16 includes a unit that outputs a user interface image (UI) for receiving information from the user, and a game image. The output unit 16 includes a display that presents an image to the user. The network interface 18 connects the game terminal 100 to the information network 104 to input/output information. The game terminal 100 can exchange, with the network interface 18, information with the server 102 through the information network 104.

Figure 3:
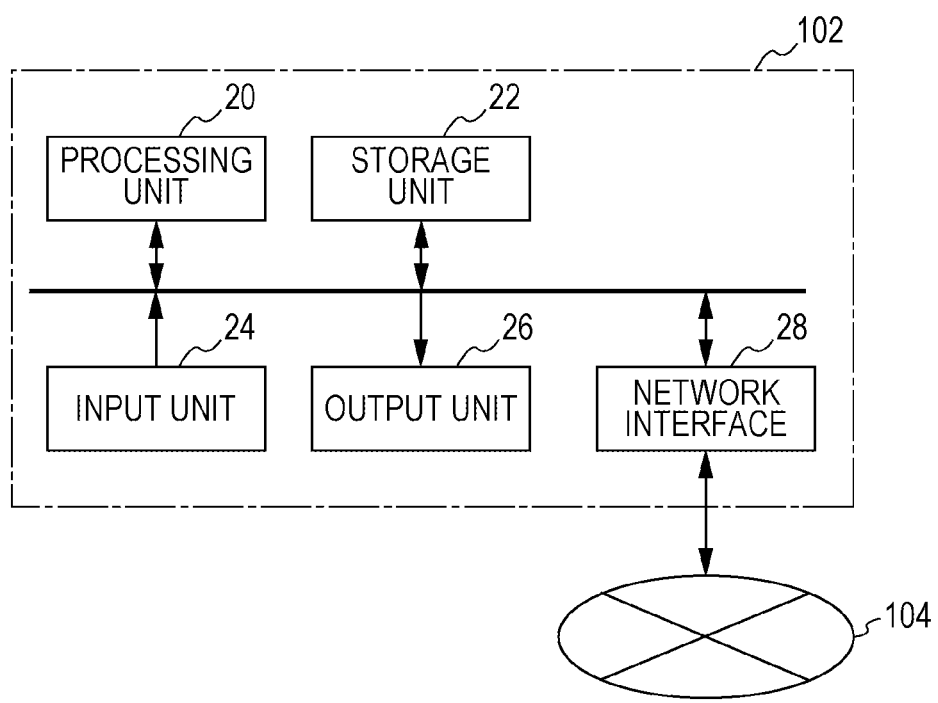
FIG. 3 is a diagram illustrating a configuration of a server in the embodiment of the present invention.

Further, as illustrated in FIG. 3, the server 102 is configured from a processing unit 20, a storage unit 22, an input unit 24, an output unit 26, and a network interface 28. That is, the server 102 includes a basic configuration of a computer, and can be a typical server computer, or the like.

The processing unit 20 includes a unit that performs calculation processing, such as a CPU. The processing unit 20 executes an electronic game server program stored in the storage unit 22, thereby to realize the electronic game processing in the present embodiment. The storage unit 22 includes a storage unit, such as a semiconductor memory or a hard disk. The storage unit 22 is accessibly connected with the processing unit 20, and stores an electronic game server program, information necessary in the electronic game, and the like. The input unit 24 includes a unit that inputs information to the server 102. The input unit 24 includes a keyboard, and the like that receives an input from a game administrator. The output unit 26 includes a unit that outputs an image for performing management of the game, and the like. The output unit 26 includes a display that presents an image to the user. The network interface 28 connects the server 102 to the information network 104, and inputs/outputs information. The server 102 can exchange, with the network interface 28, information through the information network 104.

Figure 4:
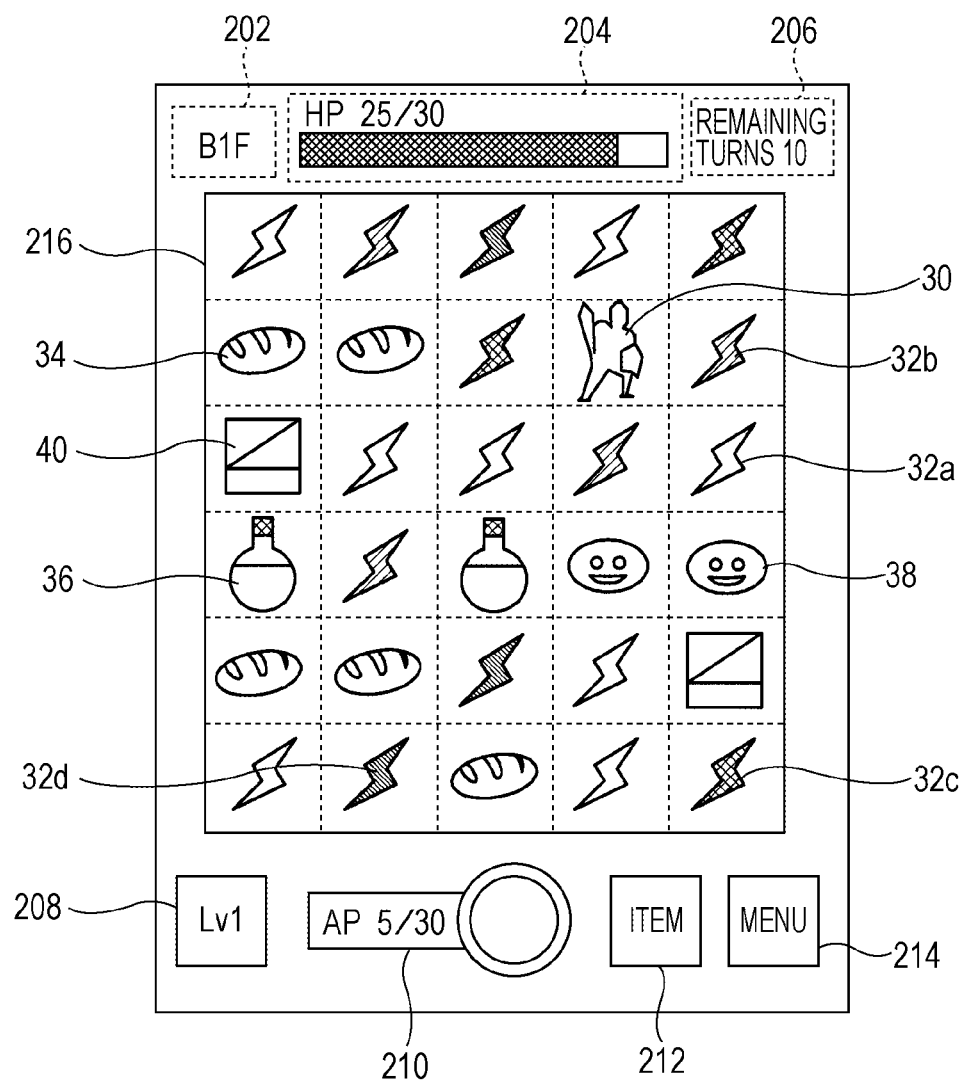
FIG. 4 is a diagram illustrating a display example of an electronic game image in the embodiment of the present invention.

The electronic game system in the present embodiment displays a game image 200 as exemplarily illustrated in FIG. 4 in the output unit 16 of the game terminal 100, and executes a puzzle game. The game image 200 includes a player character 30, a plurality of types of panels 32 to 36, an enemy character 38, and an obstacle 40. The player (user) selects and traces the panels 32 to 36 and the enemy character 38 on the game image 200 using the input unit 14 of the game terminal 100 to obtain an effect on the game.

Figure 5:
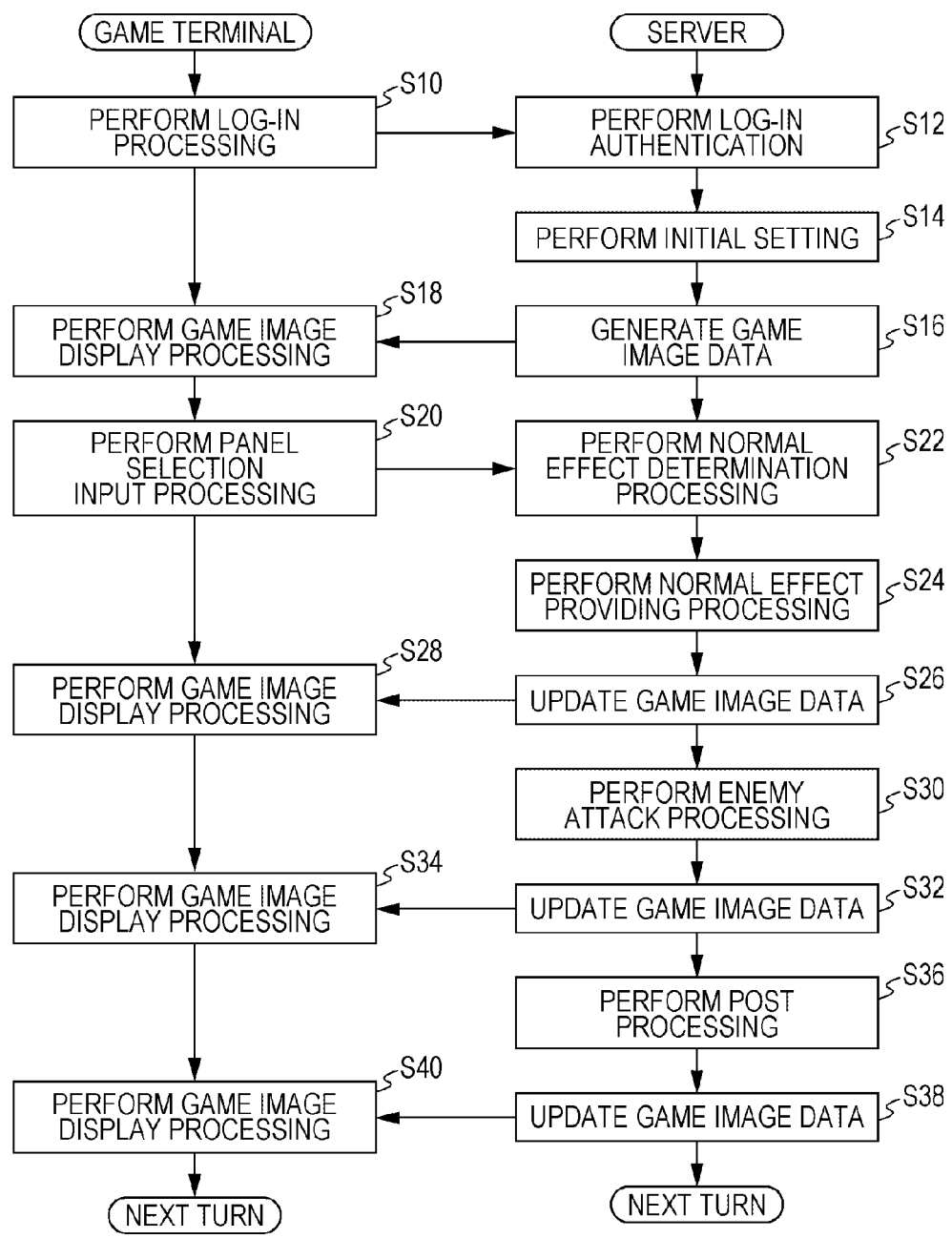
FIG. 5 is a flowchart of electronic game processing in the embodiment of the present invention.

Hereinafter, the electronic game processing in the present embodiment will be described with reference to the flowchart of FIG. 5.

In the present embodiment, the game terminal 100 executes an electronic game application, which is a web application downloaded from the server 102 in advance, thereby to receive data necessary for progress of the electronic game from the server 102, and to transmit the input by the player to the server 102. The server 102 executes the electronic game server program to receive information necessary for progress of the game from the game terminal 100, performs processing of providing an effect on the game and processing such as generation of game image data, and the like according to the received information, and transmits the information necessary for progress of the game to the game terminal 100. As described above, in the present embodiment, the game terminal 100 and the server 102 work together to realize providing of an electronic game to the player in the game terminal 100.

In step S10, log-in processing from the game terminal 100 is performed. The player (user) who intends to start the electronic game inputs information for performing log-in to the server 102, through the input unit 14 of the game terminal 100. For example, the player inputs a URL to access the server 102, the URL being for providing an electronic game in the server 102, and inputs a user ID and a password. The information necessary for log-in is transmitted from the game terminal 100 to the server 102.

In step S12, authentication processing of log-in is performed in the server 102. The server 102 receives the information transmitted from the game terminal 100 in step S10, and determines whether permitting the player (user) to perform the log-in. For example, the server 102 determines whether the user ID has already been registered, and if having been registered, the server 102 determines whether the password has been registered in association with the user ID. Then, if the user ID and the password are matched, the server 102 permits the log-in. If the user ID and the password are not matched, the server 102 does not permit the log-in.

The log-in processing in steps S10 and S12 is not limited thereto, and any processing may be employed as long as the processing is capable of identifying the player who performs the electronic game. When the log-in is permitted, the server 102 is moved onto initial setting processing of step S14.

In step S14, the initial setting processing for starting the electronic game is performed. The server 102 reads information related to the game registered in association with the user ID of the player (user) who has performed the log-in processing, and performs initial setting.

In the puzzle game in the present embodiment, the information related to the game includes information related to a stage of the game, information related to a player character, and information related to equipment/item of the player character. The information related to a stage of the game is information for identifying which stage of the game has been cleared for each player, and which background image data or arrangement of puzzles of a stage should be used. For example, as illustrated in a registration example of a stage database of FIG. 6, the information related to a stage includes a type of a dungeon and a floor number associated with the user ID. The information related to a player character is information that indicates a current characteristic of the player character operated by the player. For example, as illustrated in a registration example of a player character database of FIG. 7, the information related to a player character includes a type of the player character, a level, the number of remaining turns, a remaining hit point (HP), a remaining ability point (AP), a job, coordinate values, and equipment, associated with the user ID. The information related to equipment/item of the player character is information provided to the player character, and related to equipment and an item that provides attack strength, defense strength, and a special effect in the game. For example, as illustrated in a registration example of an equipment item database of FIG. 8, the information related to equipment/item includes information related to a weapon, a guard, and an item owned by the player character, associated with the user ID.

In step S16, the server 102 generates game image data. The server 102 reads the information related to a stage associated with the player from the stage database, and identifies data such as background image data, arranged locations of the panels, a position of the obstacle, and the like. These data may just be registered in an image database in advance.

Figure 9:
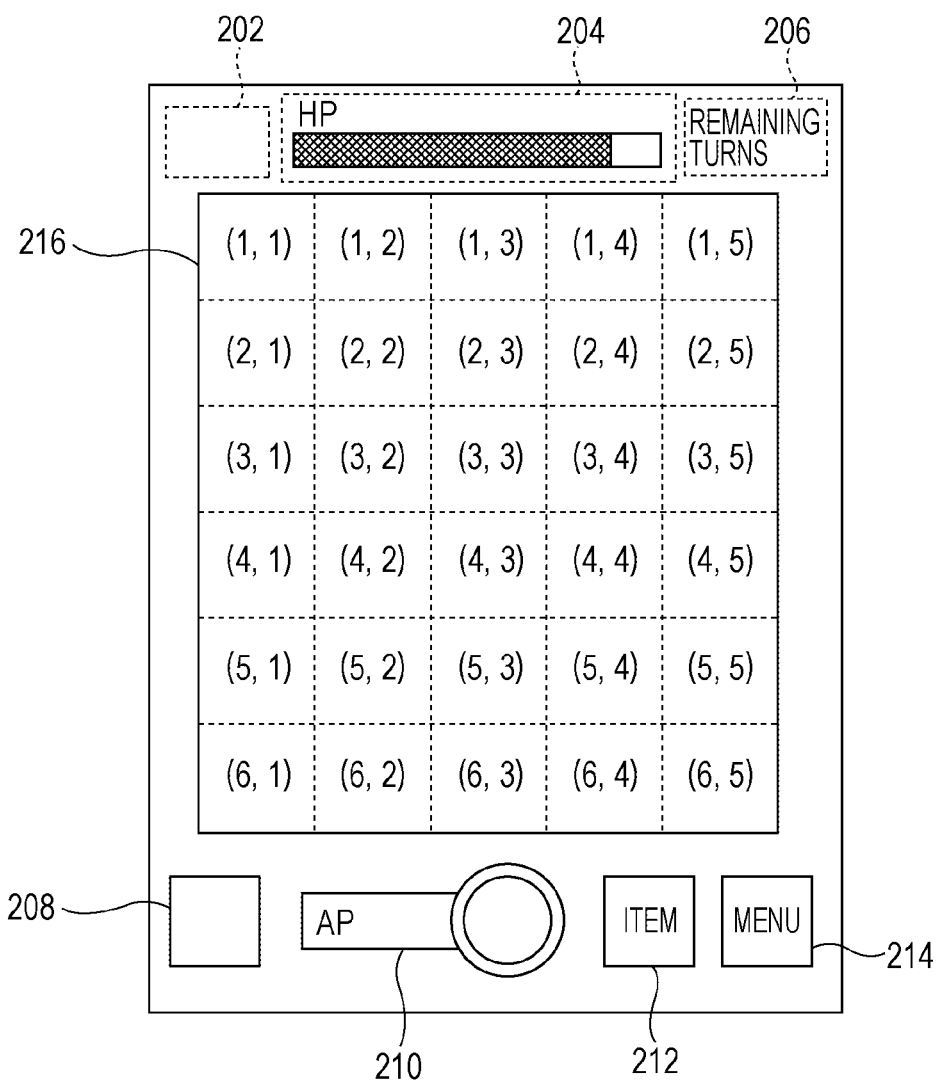
FIG. 9 is a diagram illustrating an example of a background image of an electronic game image in the embodiment of the present invention.

For example, when the user ID of the player is "01", the server 102 reads the type of a dungeon and the floor number associated with the user ID "01" from the stage database. Further, the server 102 reads the data of background image data, arranged locations of the panels, and a position of the obstacle 40 registered with respect to the read type of a dungeon and the floor number in advance from the storage unit 22. The background image data can be an image as illustrated in FIG. 9. Note that, in FIG. 9, coordinate values of the arranged location of the panel are illustrated by (*, *) for description. However, the coordinate values are not actually displayed as the background image.

A panel arrangement database is a database in which characters and panels are registered with respect to respective coordinate values in a panel area 216 of the game image data, as illustrated in FIG. 10. When a game that has been stopped in the middle of the game is resumed, the server 102 reads the coordinate values of the player character 30, the attack panel 32, the recovery panel 34, the magic panel 36, and the enemy character 38 from the panel arrangement database.

Further, the server 102 reads data of the player character selected by the logged-in player from the player character database. The data of the player character includes a type of the player character, a level, the number of remaining turns, a remaining HP, and a remaining AP. Further, the server 102 reads the character image data registered with respect to the read player character in advance from the storage unit 22.

Note that, when the logged-in player first plays a game, the information related to the stage, and the information related to the player character are newly set. For example, the type of a dungeon and the floor number may be set to predetermined initial values. Further, as for the player character, the player is prompted to select the type, and the level, the number of remaining turns, the remaining HP, and the remaining AP may be set to predetermined initial values determined with respect to the selected player character in advance. The set information related to the stage and the set information related to the player character are newly registered in the stage database and the player character database, respectively, in association with the user ID.

Further, when a game is newly started, or when the game is moved onto a new type of a dungeon and a new floor number, the coordinate values of the player character 30, the attack panel 32, the recovery panel 34, the magic panel 36, and the enemy character 38 are registered in the panel arrangement database. Hereinafter, a method of newly determining the coordinate values of the player character 30, the attack panel 32, the recovery panel 34, the magic panel 36, and the enemy character 38 will be described.

Initial coordinate values of the player character 30 may just be set to coordinate values other than the coordinate values of the obstacle 40 set in advance in each background image data of the arranged locations of the panels. For example, the initial coordinate values of the player character 30 may be set in each stage (the type of a dungeon, the floor number, and the like) of the game in advance, or may be stochastically or randomly set to coordinate values other than the coordinate values of the obstacle 40.

Initial coordinate values of the enemy character 38 may just be set to coordinate values other than the coordinate values in which the obstacle 40 and the player character 30 are arranged. For example, the initial coordinate values of the enemy character 38 may be set in each stage (the type of a dungeon, the floor number, and the like) of the game in advance, or may be stochastically or randomly set to coordinate values other than the coordinate values of the obstacle 40 and the player character 30.

Note that a plurality of types of the enemy characters 38 may be set. To respective types of the enemy characters 38, mutually different attack strengths, defense strengths, HPs, APs, and attributes can be set. As illustrated in an enemy character database of FIG. 11, characteristics of a plurality of types of enemy characters A to H (the attack strengths, defense strengths, HPs, APs, and the like) are set in advance. Note that, in the present embodiment, attributes may be set to the respective enemy characters A to H. Any of no-attribute and attributes of fire, tree, and water is allocated to each of the enemy characters A to H.

Further, what type of enemy character 38 is generated may be set for each game stage (a type of a dungeon, the floor number, and the like) in advance, or the enemy character 38 may be stochastically or randomly generated. For example, as illustrated in an enemy character arrangement database of FIG. 12, the total number of enemy characters 38 and occurrence percentages of the respective enemy characters A to H are registered for each game stage (a type of a dungeon, the floor number, and the like), and the enemy characters A to H may just be stochastically generated within a range of the total number of enemy characters 38. The generated enemy character 38 is registered in an enemy character status database of FIG. 13. In the enemy character status database, a current status (the HP, AP, and the like) of the enemy character 38 currently appearing in the game is registered.

Initial coordinate values of the attack panel 32 may be set to coordinate values other than the coordinate values where the obstacle 40, the player character 30, and the enemy character 38 are arranged. For example, the initial coordinate values of the attack panel 32 may be set for each game stage (a type of a dungeon, the floor number, and the like) in advance, or may be stochastically or randomly set to coordinate values other than the coordinate values of the obstacle 40, the player character 30, and the enemy character 38.

A plurality of types of attack panels 32 may be set. For example, one of the attributes may be allocated to the attack panel 32. For example, the attack panels 32 may be divided into four attributes: an attack panel 32a of no-attribute, an attack panel 32b of an attribute of fire, an attack panel 32c of an attribute of tree, and an attack panel 32d of an attribute of water. Then, the attack panels 32 of the plurality of attributes may be mixed and arranged. Which attack panel 32 of an attribute is arranged may be set for each game stage (a type of a dungeon, the floor number, and the like) in advance, or may be stochastically or randomly set. For example, as illustrated in an attack panel database of FIG. 14, the total number of attack panels 32 and occurrence percentages of respective attack panels 32 are registered for each game stage (a type of a dungeon, the floor number, and the like), and any of the attack panels 32 of an attribute may just be stochastically generated within the range of the total number of the attack panels 32.

Coordinate values of the recovery panel 34 may be set to coordinate values other than the coordinate values where the obstacle 40, the player character 30, the enemy character 38, and the attack panel 32 are arranged. For example, initial coordinate values of the recovery panel 34 may be set for each game stage (a type of a dungeon, the floor number, and the like) in advance, or may be stochastically or randomly set to coordinate values other than the coordinate values of the obstacle 40, the player character 30, the enemy character 38, and the attack panel 32. Further, the number of the recovery panels 34 may be set for each game stage (a type of a dungeon, the floor number, and the like) in advance, or may be stochastically or randomly set.

Coordinate values of the magic panel 36 may just be set to coordinate values other than the coordinate values where the obstacle 40, the player character 30, the enemy character 38, the attack panel 32, and the recovery panel 34 are arranged.

Note that the numbers of the attack panels 32, the recovery panels 34, the magic panels 36, and the enemy characters 38 may be set for each of the types of a dungeon and the floor numbers like the present embodiment, or may be stochastically or randomly allocated every time the game image is updated. At this time, the numbers of the attack panels 32, the recovery panels 34, the magic panels 36, and the enemy characters 38 are favorably set to enhance the enjoyment of the game according to the game stage (a type of a dungeon, the floor number, and the like), a level of the player character, or the like. For example, if the number of the enemy characters 38 is increased, and the numbers of the attack panels 32, the recovery panels 34, and the magic panels 36 are relatively decreased as the game progresses, the difficulty of the game is increased, and a sense of joy of when the player has cleared the game can be increased.

As described above, the server 102 determines the coordinate values of the obstacle 40, the player character 30, the enemy character 38, the attack panel 32, the recovery panel 34, and the magic panel 36, and registers the coordinate values in the panel arrangement database.

The server 102 generates game image data obtained such that the information such as image data of the characters and panels, the level of the player character, the number of remaining turns, the remaining HP, and the remaining AP is superimposed on background image data. That is, the image data of the player character 30, the attack panel 32, the recovery panel 34, the magic panel 36, the enemy character 38, and the obstacle 40 is registered in the storage unit 22 in advance. The server 102 reads the image data of panels registered in the panel arrangement database, and writes the image data in an image area identified by the coordinate values of the panel area 216 of the background image data. Further, the server 102 writes the information of the floor number of the dungeon, the remaining HP of the player character, the number of remaining turns, the level, the remaining AP in a floor number display area 202, an HP display area 204, a turn display area 206, a level display area 208, and an AP display area 210, respectively. In this way, the game image data as illustrated in FIG. 4 is generated.

Note that the display format of each data is favorably a format that can be easily understood by the player. For example, the remaining HP, the remaining AP, and the like may be displayed as level indicators that indicate respective values in a bar graph manner.

The generated game image data is transmitted from the server 102 to the game terminal 100. Note that the panel arrangement database, the player character database, the enemy character database, the enemy character arrangement database, the enemy character status database, the attack panel database, and the like may be transmitted to the game terminal 100, in advance, as needed, or the game terminal 100 may access the server 102 and refer to the databases as needed.

In step S18, the game image is displayed in the game terminal 100. The game terminal 100 receives the game image data from the server 102, and displays the game image in the output unit 16 based on the game image data. Accordingly, the game image illustrated in FIG. 4 is displayed in the touch panel, or the like.

In step S20, processing of a selection input of the panels is performed in the game terminal 100. The selection input of the panels is received from the player using the input unit 14 of the game terminal 100. The input is favorably performed through the touch panel in terms of operability. However, a keyboard, a cursor button, or the like may be used.

The selection of the panels is started from the player character 30. That is, the player selects (touches in the case of a touch pane) the area where the player character 30 is displayed as a start point of the selection of the panels. Following that, the player continuously selects (flicks in the case of a touch panel) the same type of adjacent panels. The panels may be able to be selected if they are adjacent in at least one of vertical, horizontal, and diagonal directions. Alternatively, the panels may be able to be selected only if they are vertically adjacent, may be able to be selected only if horizontally adjacent, or may be able to be selected only if diagonally adjacent, or a combination thereof may be employed.

The game terminal 100 refers to the panel arrangement database, and determines whether the panels registered in the coordinate values selected by the player are the same type of panels. The game terminal 100 performs processing such that the panels can be continuously selected if the panels are the same type, and cannot be selected if the panels are not the same type. Note that the panel of the obstacle 40 cannot be selected.

Figure 15:
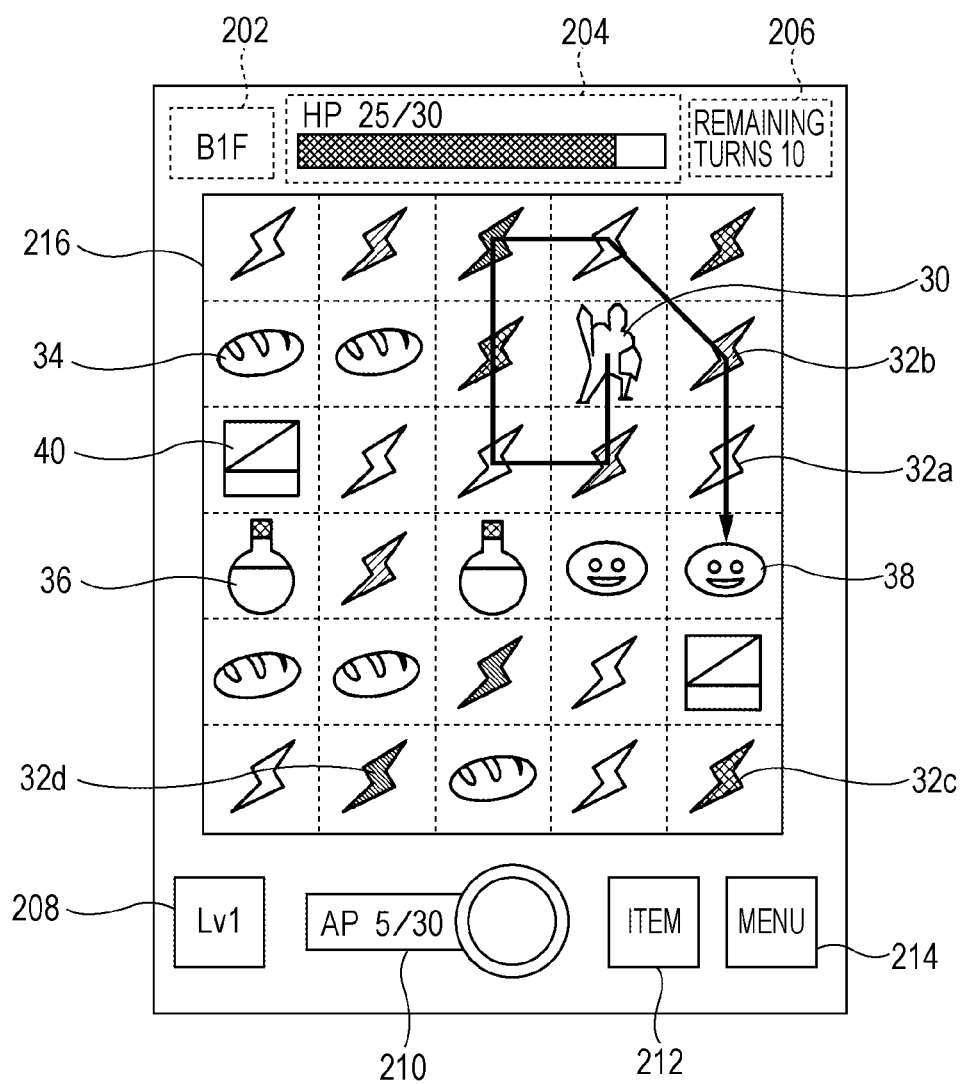
FIG. 15 is a diagram illustrating a selection example of panels in the embodiment of the present invention.

For example, as illustrated in FIG. 15, the adjacent attack panels 32 can be traced and continuously selected. In the present embodiment, the attack panels 32 can be continuously traced and selected regardless of the attribute. When the attack panels 32 are selected, the attack panels 32 are continuously traced and selected starting from the player character 30, and finally any of the enemy characters 38 is continuously traced. Accordingly, an attack can be made on the selected enemy character 38.

Note that the attack panels 32 may be able to be continuously traced and selected only if the attack panels 32 have the same attribute. Further, the attack panels 32 may be able to be continuously traced and selected if the attack panels 32 have a plurality of predetermined types of attributes. For example, the attack panels 32 may be able to be selected if the attack panels 32 are the attack panels 32b having the attribute of fire. The same applies to the non-attribute and the attributes of tree and water, or a combination of such conditions may be employed.

Similarly, the adjacent recovery panels 34 can be continuously traced and selected. In this case, the HP of the player character 30 can be recovered. Further, adjacent magic panels 36 can be continuously traced and selected. In this case, the AP of the player character 30 can be increased.

Note that the player can select the panels once in one turn. That is, one turn is consumed every time any of the attack panels 32, the recovery panels 34, and the magic panels 36 are continuously selected starting from the player character 30 as a starting point.

Further, when the panels are selected, a locus of the selection so far may be displayed, as illustrated by the arrow of FIG. 15. Accordingly, the player can easily grasp which panels the player has selected, and the operability of the game can be improved.

Further, the selection of the panels may be able to be tried again. For example, it may be configured such that, when the player wishes to try the selection again in the middle of continuous selection of the panels, the player returns the selection to a region of a previously selected panel, so that the player can select another panel. Accordingly, the player can select the panels by trial and error, and the operability of the game can be improved.

The game terminal 100 transmits information indicating the coordinate values of the selected panels and a selection order to the server 102. For example, in the case of FIG. 15, the coordinate values (2, 4), (3, 4), (3, 3), (2, 3), (1, 3), (1, 4), (2, 5), (3, 5), and (4, 5) of the background image data of FIG. 9 are arranged in the selection order and transmitted.

In step S22, processing of determining an effect on the game according to the selection of the panels is performed. When having received the information indicating the coordinate values and the selection order of the selected panels from the game terminal 100, the server 102 executes the processing of determining an effect on the game according to the information.

When the attack panels 32 are traced and the selection has been made, the server 102 refers to the panel arrangement database, and obtains the number of selected attack panels 32 and the coordinate values of the finally selected enemy character 38 from the received information. For example, in the case of FIG. 15, the number of selected attack panels 32 is seven, and the coordinate values of the finally selected enemy character 38 are (4, 5).

At this time, the server 102 may refer to the enemy character status database and determine damage according to the number of attack panels 32 selected with respect to the enemy character of the extracted coordinate values. That is, it is favorable to make the damage to be provided to the enemy character 38 larger as the number of selected attack panels 32 is larger.

For example, the server 102 makes the damage to be provided to the enemy character 38 larger in proportion to the number of selected attack panels 32. Further, for example, the server 102 makes the damage to be provided to the enemy character 38 exponentially larger as the number of selected attack panels 32 is increased. Further, the server 102 may determine the damage to be provided to the enemy character 38 by substituting the number of selected attack panels 32 into a predetermined function.

As described above, the damage to be provided to the enemy character 38 is increased/decreased according to the number of selected attack panels 32, whereby the strategic characteristic of continuous selection of the attack panels 32 as many as possible is increased, and the enjoyment of the game can be improved.

Further, the damage to be provided to the enemy character 38 may be corrected according to the relationship between the attribute of the enemy character 38 and the attribute of the attack panel 32 selected immediately before the enemy character 38 is selected. For example, when the attack panel 32b having the attribute of fire has been selected immediately before the enemy character 38 having the attribute of tree is selected, the damage to be provided to the enemy character 38 is doubled. Further, when the attack panel 32b having the attribute of fire has been selected immediately before the enemy character 38 having the attribute of water is selected, the damage to be provided to the enemy character 38 is halved. Further, when either the enemy character 38 or the attack panel 32 is the no-attribute, the damage to be provided to the enemy character 38 is not changed.

As described above, the damage to be provided to the enemy character 38 is corrected according to the relationship between the attributes, whereby the strategic characteristic of consideration of the selection order of the attack panels 32 is increased, and the enjoyment of the game can be improved.

Further, a special weapon based on the attribute may be caused according to the number of attack panels 32 having the same attribute. For example, when the number of attack panels 32 having the same attribute is a predetermined number or more, the damage to be provided to the enemy character 38 is increased. Further, the special weapon based on the attribute may be caused according to the number of continuously traced and selected attack panels 32 having the same attribute. For example, when the number of continuously traced and selected attack panels 32 having the same attribute is a predetermined number or more, the damage to be provided to the enemy character 38 is increased.

Further, the damage may be corrected in consideration of the attack strength according to the type, the level and the job of the player character 30. For example, an attack strength correction coefficient, which becomes a base, is determined according to the type, the level and the job of the player character 30, and the damage to be provided to the enemy character 38 may be determined by being multiplied the attack strength correction coefficient.

Accordingly, the damage in which characteristics of the player character 30 selected by the player, such as the type and the job, are reflected is provided, and the strategic characteristic of the type and job selection of the player character 30 is increased, and the enjoyment of the game can be improved. Further, if the attack strength is made larger as the level of the player character 30 becomes higher, the incentive of the player to continue the game can be increased.

Further, the damage may be provided considering the attack strength according to a weapon that the player character 30 is equipped with. The player can select a weapon registered in the equipment item database and equips the player character 30 with the weapon. The attack strength correction coefficient is determined to each weapon, and the damage is corrected according to an accumulation value of the attack strength correction coefficients of the equipped weapons. For example, the damage to be provided to the enemy character 38 may be determined such that the damage without considering a weapon is multiplied by the accumulation value of the attack strength correction coefficients.

Further, an attribute may be set to a weapon, and the attack strength correction coefficient may be increased/decreased according to the relationship between the attribute of the enemy character 38 to be attacked and the attribute of the weapon. For example, when the weapon having the attribute of fire has been selected against the enemy character 38 having the attribute of tree, the attack strength correction coefficient is doubled. When the weapon having the attribute of fire has been selected against the enemy character 38 having the attribute of water, the attack strength correction coefficient is halved. Further, when either the enemy character 38 or the weapon is the no-attribute, the attack strength correction coefficient is unchanged.

Further, the damage to be provided to the enemy character 38 may be increased/decreased according to the relationship between the attribute of the selected attack panel 32 and the weapon that the player character 30 is equipped with. For example, when the attribute of the finally selected attack panel 32 and the attribute of the weapon that the player character 30 is equipped with coincide with each other, the damage to be provided to the enemy character 38 may be increased. Further, for example, when the attribute of the most selected attack panels 32 and the attribute of the weapon that the player character 30 is equipped with coincide with each other, the damage to be provided to the enemy character 38 may be increased.

Note that the number of weapons, protective guards, and items that the player character 30 can be equipped with may be limited, or exchange of the weapon, protective guard, and item may be limited within the same dungeon.

Accordingly, the strategic characteristic of selection of a weapon that might effectively provide the damage to the enemy character 38 is increased, and the enjoyment of the game can be improved. Further, the incentive of the player to continue the game to get a weapon that further increases the attack strength can be increased.

Further, correction to decrease the damage against the enemy character 38 may be performed according to the defense strength of the enemy character 38. The server 102 refers to the enemy character database, and acquires the defense strength registered in association with the enemy character 38 to be attacked. Then, the server 102 performs processing of decreasing the damage against the enemy character 38 according to the acquired defense strength. For example, the server 102 performs correction by dividing the damage against the enemy character 38 by the acquired strength. Further, for example, the server performs correction by subtracting the defense strength from the damage against the enemy character 38.

Further, similarly, the server 102 determines an effect on the game when the recovery panels 34 have been selected. In this case, it is favorable to recover the HP of the player character 30 according to the number of the recovery panels 34. That is, it is favorable to make the recovery value of the HP of the player character 30 larger as the number of continuously selected recovery panels 34 is increased.

For example, the server 102 makes the recovery value of the HP of the player character 30 larger in proportion to the number of selected recovery panels 34. Further, for example, the server 102 makes the recovery value of the HP of the player character 30 exponentially larger as the number of selected recovery panels 34 is increased. Further, the server 102 may determine the recovery value of the HP of the player character 30 by substituting the number of selected recovery panels 34 into a predetermined function.

Further, similarly, the server 102 determines an effect on the game when the magic panels 36 have been selected. In this case, it is favorable to increase the AP of the player character 30 according to the number of the magic panels 36. That is, it is favorable to make an increase value of the AP of the player character 30 larger as the number of continuously selected magic panels 36 is larger.

For example, the server 102 makes the increase value of the AP of the player character 30 larger in proportion to the number of selected magic panels 36. Further, for example, the server 102 makes the increase value of the AP of the player character 30 exponentially larger as the number of selected magic panels 36 is increased. Further, the server 102 may determine the increase value of the AP of the player character 30 by substituting the number of selected magic panels 36 into a predetermined function.

In step S24, processing of providing an effect on the game is performed. The server 102 executes processing of the effect on the game determined in step S22, that is, providing of the damage to the enemy character 38, recovery of the HP or an increase in the AP of the player character 30.

When providing the damage to the enemy character 38, the server 102 refers to the enemy character status database, and subtracts a value by the determined damage from the HP of the enemy character 38 associated with the finally selected coordinate values.

For example, when the coordinate values of the finally selected enemy character 38 are (4, 5) and the determined damage is 3, in the example of FIG. 13, the server 102 changes the HP of an enemy character B having the coordinate values of (4, 5) to 5−3=2.

If the HP of the enemy character 38 to which the damage is provided becomes 0, the enemy character 38 is considered defeated, and the server 102 deletes the enemy character 38 from the enemy character status database. Further, the server 102 also deletes the enemy character 38 registered in the same coordinate values in the panel arrangement database.

Further, when recovering the HP of the player character 30, the server 102 refers to the player character database, and adds the recovery value of the HP determined in step S22 to the remaining HP of the player character 30 associated with the user ID of the player. At this time, an upper limit of the remaining HP of the player character 30 is determined in advance, and when the remaining HP exceeds the upper limit as a result of the adding of the recovery value, the remaining HP is limited to the upper limit.

Further, when increasing the AP of the player character 30, the server 102 refers to the player character database, and adds the increase value determined in step S22 to the remaining AP of the player character 30 associated with the user ID of the player. At this time, an upper limit of the remaining AP of the player character 30 is determined in advance, and when the remaining AP exceeds the upper limit as a result of the adding of the increase value, the AP is limited to the upper limit.

Further, processing of changing the position of the player character 30 is performed. The server 102 moves the player character 30 from the coordinate values that are the starting point of the selected panels to the finally selected coordinate values. To be specific, the server 102 refers to the panel arrangement database, and registers the player character 30 in association with the coordinate values of the finally selected panel or character. Further, the server 102 deletes the panels or characters registered in association with the coordinate values other than the finally selected coordinate values, of the selected panels.

For example, in the selection example of FIG. 15, the server 102 deletes the panels or characters associated with the coordinate values of (2, 4), (3, 4), (3, 3), (2, 3), (1, 3), (1, 4), (2, 5), and (3, 5) in the panel arrangement database, and registers the player character 30 in association with the coordinate values of (4, 5).

In step S26, the server 102 generates the game image data based on the updated panel arrangement database. The server 102 transmits the generated game image data to the game terminal 100.

At this time, to display the state of movement of the player character 30 easily understood by the player, the server 102 may move and display an image of the player character 30 toward the final coordinate values while deleting the image of the panels displayed along the locus of the selected panels. When performing this processing, the server 102 transmits the game image data to the game terminal 100 while updating the game image data, and the updated game image data may be displayed in the output unit 16 in the game terminal 100.

Figure 16:
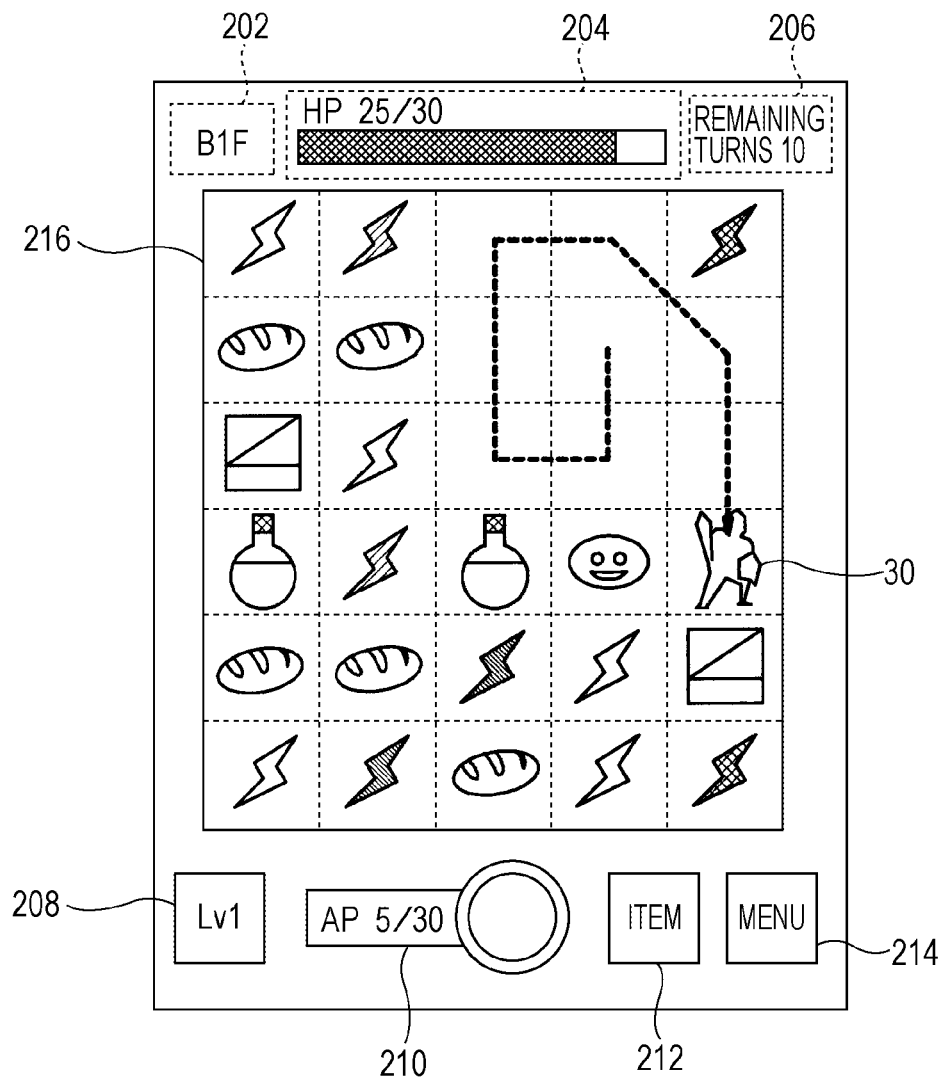
FIG. 16 is a diagram illustrating a display example of movement of a player character in the embodiment of the present invention.

In step S28, processing of displaying the game image is performed. The game terminal 100 receives the game image data transmitted from the server 102, and updates the game image displayed in the output unit 16 based on the game image data. For example, when the selection of FIG. 15 has been performed, the game image is updated to the game image as illustrated in FIG. 16.

Further, as described above, the game terminal 100 may display the game image such that the image of the player character 30 is moved along the locus of the selected panels.

In step S30, processing of an attack from the enemy character 38 is performed. In the present embodiment, the server 102 performs the processing of movement of the enemy character 38 and an attack from the enemy character 38 to the player character 30.

The server 102 refers to the panel arrangement database, and acquires the coordinate values of remaining enemy character 38. Further, the server 102 refers to the enemy character database, and acquires movement characteristics of the remaining enemy characters 38. The server 102 determines new coordinate values that are moved from the coordinate values acquired for each remaining enemy character 38 by the movement characteristic. The moving direction may be a predetermined direction, or any of vertical (up and down), horizontal (right and left), and diagonal (upper left, lower left, upper right, lower right) directions may be randomly or stochastically determined as the moving direction. Note that, when the player character 30 or the obstacle 40 is registered to the new coordinate values, the movement is not possible, and the moving processing is performed again.

The server 102 refers to the panel arrangement database, and updates registration of the previous coordinate values with the newly determined coordinate values for each enemy character 38. At this time, when another panel has been registered to the newly determined coordinate values, the server 102 exchanges the enemy character 38 registered to the previous coordinate values and the panel registered to the newly determined coordinate values. Alternatively, the server 102 registers a randomly selected panel to the previous coordinate values of the enemy character 38.

Note that the method of moving the enemy character 38 is not limited to the above embodiment, and any method may be employed as long as the method is performed along predetermined processing.

Further, the server 102 performs attack processing from the enemy character 38 to the player character 30. The server 102 refers to the panel arrangement database, and acquires new coordinate values of remaining enemy characters 38. Further, the server 102 refers to the enemy character database, and acquires an attack range of the remaining enemy characters 38.

The server 102 determines whether the player character 30 is registered within the attack range from the coordinate values acquired for each remaining enemy character 38. When the player character 30 is within the attack range, the server 102 further refers to the enemy character database, acquires the attack strength of the appropriate enemy character 38, and determines the damage to be provided to the player character 30 according to the attack strength. At this time, it is favorable to make the damage to be provided to the player character 30 larger as the attack strength of the enemy character 38 is larger.

Further, the server 102 may perform correction to decrease the damage against the player character 30 according to the defense strength of the player character 30. The server 102 refers to the player character database, and acquires the defense strength of the player character 30 associated with the user ID of the player. Then, the server 102 performs the processing of decreasing the damage against the player character 30 according to the acquired defense strength. For example, the server 102 performs correction by dividing the damage against the player character 30 by the acquired defense strength. Further, for example, the server 102 may perform correction by subtracting the defense strength from the damage against the player character 30.

Further, the damage may be provided in consideration of the defense strength according to the protective guard that the player character 30 is equipped with. The player can select a protective guard registered in the equipment item database and equip the player character 30 with the selected protective guard. A defense strength correction coefficient is determined for each protective guard in advance, and the server 102 corrects the damage according to an accumulation value of the defense strength correction coefficients of the equipped protective guards. For example, the server 102 may determine the damage to be provided to the player character 30 by dividing the damage without considering the protective guard by the accumulation value of the defense strength correction coefficients.

Further, an attribute is set to the protective guard, and the defense strength correction coefficient may be increased/decreased according to the relationship between the attribute of the enemy character 38 that is an attack source and the attribute of the protective guard. For example, when the protective guard having the attribute of fire has been selected against the enemy character 38 having the attribute of tree, the defense strength correction coefficient is doubled. Further, when the protective guard having the attribute of fire has been selected against the enemy character 38 having the attribute of water, the defense strength correction coefficient is halved. Further, when either the enemy character 38 or the protective guard is the no-attribute, the defense strength correction coefficient is unchanged.

The server 102 refers to the player character database, and subtracts the HP by the damage determined for each enemy character 38 from the remaining HP of the player character 30 associated with the user ID of the player.

If the HP of the player character 30 to which the damage is provided becomes 0, the player character 30 is considered defeated, and the game is over.

As described above, the processing is performed such that the enemy character 38 is moved and makes an attack on the player character 30, whereby the strategic characteristic that the player predicts how the enemy character 38 is moved, and moves the player character 30 is increased, and the enjoyment of the game is improved. For example, the player is expected to select the panels such that the player character 30 is moved to a position not surrounded by the enemy characters 38, and thus the strategic characteristic of the game is increased.

Further, the enemy character 38 may be able to acquire the attack panels 32, and the damage provided to the player character 30 may be corrected according to the number of the attack panels 32 passed by the enemy character 38 while being moved or the attribute.

In step S32, processing of updating the game image data in consideration of a result of an attack from the enemy character is performed. The server 102 generates the game image data based on the panel arrangement database updated by the movement of the enemy character 38. The server 102 transmits the generated game image data to the game terminal 100.

At this time, the server 102 may update the image of the player character 30 with an image that shows a state of being received the damage according to the damage provided to the player character 30 (or the remaining HP of the player character 30).

In step S34, processing of displaying the game image is performed. The game terminal 100 receives the game image data transmitted from the server 102, and updates the game image displayed in the output unit 16 based on the game image data.

In step S36, post-processing is performed. The post processing means an attack by the player character 30 and processing other than the attack by the enemy character 38.

The server 102 refers to the player character database, and subtracts 1 from the number of remaining turns of the player character 30 associated with the user ID of the player. Here, when the number of remaining turns becomes 0, further attack cannot be made, and the game may be made over.

Note that, when the number of remaining turns or the remaining HP of the player character 30 becomes 0, the game may be made over. If the game is made over, the game may be re-played from the beginning. Further, an item acquired in the game or a penalty such as losing currency used in the game may be imposed.

With such game-over processing, the player needs to efficiently defeat the enemy character 38 and to acquire the items while considering the number of remaining turns and the remaining HP. Therefore, the strategic characteristic of the game is increased, and the enjoyment of the game can be improved.

Further, the server 102 adds and sets new panels in place of the selected panels. As described above, the panels on the game image are erased due to the selection of the panels by the player and the movement of the enemy character 38, and thus the server 102 adds and sets the panels to free areas on the game image before proceeding to the next turn. Alternatively, the server 102 may sequentially add and set panels to the free areas during movement of the player character 30 or the enemy character 38.

The server 102 refers to the panel arrangement database, and extracts the coordinate values to which a panel or a character is not registered. Then, the server 102 sets a new panel to the extracted coordinate values. As the new panel, it is favorable to appropriately combine and set the attack panel 32, the recovery panel 34, and the magic panel 36.

For example, the proportion of the attack panel 32, the recovery panel 34, and the magic panel 36 of the panels to be newly set may be set in advance, or may be stochastically or randomly set. Further, what proportion is set to the attack panel 32, the recovery panel 34, and the magic panel 36 may be determined according to the game stage (the type or the floor number of a dungeon) or the like.

Further, for example, when the attack panel 32 has been selected in this turn, a larger number of attack panels 32 may be included to the newly set panels than the recovery panel 34 and the magic panel 36. Similarly, when the recovery panel 34 has been selected in this turn, a larger number of recovery panels 34 may be included in the newly set panels than the attack panel 32 and the magic panel 36. Further, when the magic panels 36 has been selected in this turn, a larger number of magic panels 36 may be included in the newly set panels than the attack panel 32 and the recovery panel 34.

When an attribute is set to the attack panel 32, which attack panel 32 having an attribute is arranged to the panel to be newly set may be set for each game stage (a type of a dungeon, the floor number, and the like) in advance, or may be stochastically or randomly set. Similarly to the above, a total number of attack panels 32 and the occurrence percentage of each attack panel 32 are registered in the attack panel database of FIG. 14 for each game stage (a type of a dungeon, the floor number, and the like) in advance, and any of the attack panels 32 having an attribute may be stochastically generated.

The server 102 registers the attack panel 32, the recovery panel 34, and the magic panel 36 newly set to the free coordinate values in the panel arrangement database.

Further, the server 102 refers to the enemy character status database, and determines whether all of the enemy characters 38 have been defeated. If all of the enemy characters 38 have been defeated, the stage is considered cleared, and the server 102 performs processing of advancing the game to a new stage. In this case, the server 102 updates the information related to the stage (the type of a dungeon and the floor number) associated with the user ID of the player in the stage database with the next stage, and returns the processing to step S14.

Note that, when one stage has been cleared, the server 102 may recover the number of remaining turns of the player character 30. The number of turns to be recovered may be set for each game stage (a type of a dungeon, the floor number, and the like) in advance, or may be stochastically or randomly set. Further, when one stage has been cleared, the server 102 may recover the remaining HP or the remaining AP of the player character 30. Even in this case, the remaining HP or the remaining AP to be recovered may be set for each game stage (a type of a dungeon, the floor number, and the like) in advance, or may be stochastically or randomly set.

Further, the server 102 may change the level, the attack strength, and the defense strength of the player character 30 according to the progress of the game. For example, when one stage has been cleared, any of the level, the attack strength, and the defense strength of the player character 30 may be increased. While how the level, the attack strength and the defense strength are changed may just be appropriately determined, they may be set for each game stage (a type of a dungeon, the floor number, and the like) in advance, or may be stochastically or randomly set.

In step S38, new game image data is generated in consideration of the post-processing. The server 102 refers to the updated panel arrangement database, and writes the image data such as the character and the panel in the background image data and superimposes the information such as the level, the number of remaining turns, the remaining HP, and the remaining AP of the player character to generate new game image data for the next turn. The server 102 transmits the newly generated game image data to the game terminal 100.

In step S40, processing of display of the game image is performed. The game terminal 100 receives the game image data transmitted from the server 102, and updates the game image displayed in the output unit 16 based on the game image data.

Following that, the processing is moved onto the processing of the next turn. That is, the processing is returned to the processing of selection input of the panels of step S20, and the game terminal 100 receives panel selection of the player in the next turn, and executes the processing of the next turn.

<Processing with Ability Point (AP)>

In the present embodiment, processing of providing an effect on the game according to the ability point (AP) given to the player character 30 may be performed. That is, processing of putting a special ability provided to the player character 30 in motion by consuming the AP registered in the player character database may be performed.

Figure 17:
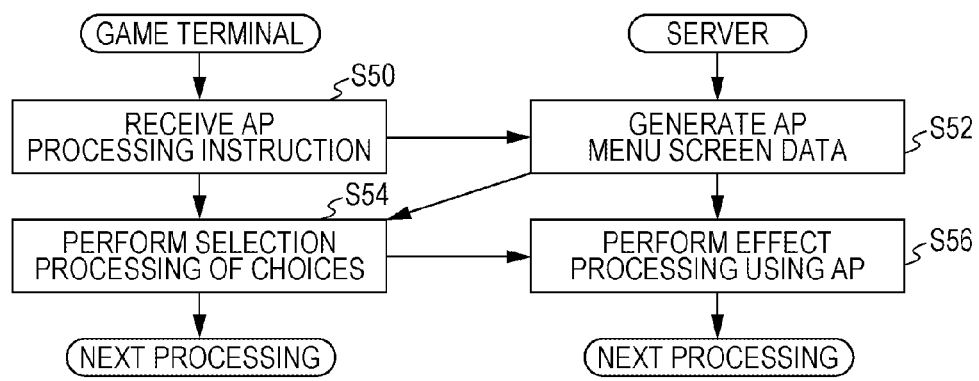
FIG. 17 is a flowchart of processing using an AP in the embodiment of the present invention.

Hereinafter, the processing of providing an effect on the game using the AP will be described with reference to the flowchart illustrated in FIG. 17.

In step S50, processing of accepting an instruction of the processing using the AP by the player is performed. The player selects (touches, in the case where the input unit 14 is a touch panel) an AP display area 210 on the game image displayed in the output unit 16 of the game terminal 100, whereby the processing with the AP is accepted. The processing with the AP may be able to be performed anytime during the game, or some limitation, such as the processing being accepted only between turns, may be provided.

When the AP display area 210 on the game image has been selected, the game terminal 100 transmits the information that indicates start of the AP processing to the server 102.

In step S52, a menu image for selecting the processing using the AP is generated. When having received the information that indicates start of the AP processing from the game terminal 100, the server 102 refers to the player character database, and acquires the remaining AP of the player character 30 associated with the user ID of the player. The server 102 determines effects on the game that can be put in motion by the player character 30 using the AP, according to the remaining AP, and generates the menu image that includes choices of the effects.

As the effects on the game using the AP, for example, recovering the remaining HP of the player character 30, an increase in the attack strength or the defense strength of the player character 30, providing the damage to the entire enemy characters 38, a decrease in the attack strength or the defense strength of the enemy character 38, and the like. The effects on the game using the AP are not limited thereto, and an effect on the game that is provided when "magic" or the like is used in a typical role-playing game is applicable.

The effects on the game using the AP are registered in the AP database. The AP database is a database in which the effect on the game using the AP and a necessary number of APs to provide the effect are associated with each other, as illustrated in the registration example of FIG. 18. The AP database may be common to all of the player characters 30, or the effects on the game that can be selected may differ according to the type, the level, the job, or the like of the player character 30.

The server 102 refers to the AP database and extracts the effects on the game using the AP executable by the remaining AP of the player character 30. Then, the server 102 generates AP menu image data including choices that indicate the extracted effects on the game using the AP. Note that, if the remaining AP is 0, the server 102 cannot provide the effects on the game by the AP, and thus generates the AP menu image data indicating the fact that the remaining AP is 0. The server 102 transmits the generated AP menu image data to the game terminal 100.

For example, the server 102 generates the AP menu image data for displaying an AP menu image 220 as illustrated in FIG. 19. The example of FIG. 19 includes a choice of "HP recovery" that indicates recovering of the remaining HP of the player character 30 and a choice of "entire attack" that indicates providing of damage to the entire enemy characters 38.

In step S54, processing of selecting the effect on the game using the AP is performed. The game terminal 100 receives the AP menu image data from the server 102, and displays the AP menu image 220 in the output unit 16. Further, the game terminal 100 receives selection of the choices included in the AP menu image 220 by the player using the input unit 14. The game terminal 100 transmits the selected choice to the server 102.

For example, when the AP menu image 220 as illustrated in FIG. 19 is displayed, the player can select one of the choices of "HP recovery" and "entire attack".

In step S56, processing of providing the effect on the game according to the selected choice. The server 102 receives information of the choice from the game terminal 100, and performs the processing of providing the effect on the game according to the choice.

For example, when the choice of "HP recovery" has been selected, the server 102 performs processing of recovering the remaining HP of the player character 30 by a predetermined number. In this case, the server 102 refers to the player character database, and increases the remaining HP associated with the user ID of the player by the predetermined number. Further, when the choice of "entire attack" has been selected, the server 102 performs processing of providing damage to all of remaining enemy characters 38. In this case, the server 102 refers to the enemy character status database, and subtracts the predetermined number from the HPs of all of registered enemy characters 38.

Note that the way of providing the effect on the game using the AP is not limited to the examples, and various effects can be applied.

Further, the server 102 decreases the remaining AP of the player character 30 according to the effect on the game based on the selected choice. That is, the server 102 refers to the player character database, and subtracts a predetermined number from the remaining AP associated with the user ID of the player.

Note that, as described above, the remaining AP can be recovered by tracing and selecting the magic panels 36 on the game image.

<Processing with Item>

In the present embodiment, processing of providing the effect on the game may be performed according to an item provided to the player character 30.

Figure 20:
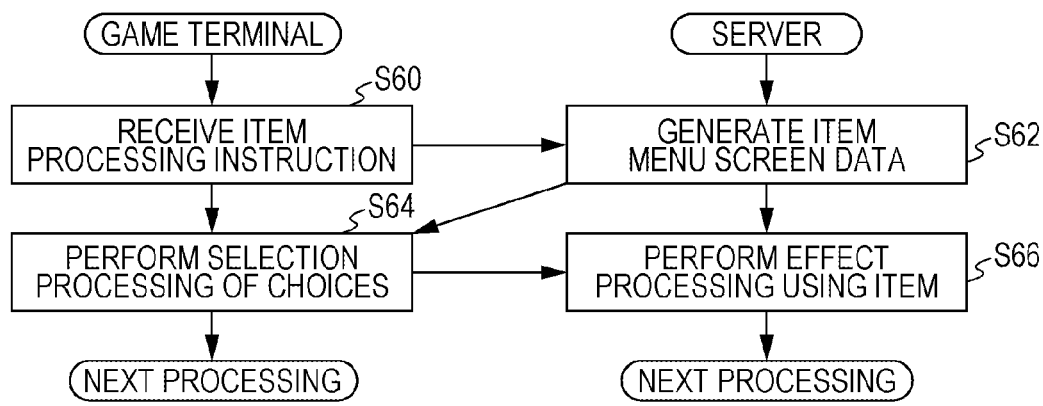
FIG. 20 is a flowchart of processing using an item in the embodiment of the present invention.

Hereinafter, the processing of providing the effect on the game using an item will be described with reference to the flowchart illustrated in FIG. 20.

Note that the items are selected by the player from the equipment item database illustrated in FIG. 8, and are held by the player character 30. For example, a predetermined number of item slots are set for each player character 30, and the items by the number of item slots may be able to be held by the player character 30 from among the items registered in the equipment item database in association with the user ID of the player. The items held by the player character 30 are registered in the player character database.

Note that the items may not be able to be added or changed until the game stage is changed. For example, the items held by the player character 30 may not be able to be changed until one dungeon is cleared.

In step S60, processing of receiving an instruction of processing using an item by the player is performed. The player selects (touches in the case where the input unit 14 is a touch panel) an item selection area 212 on the game image displayed in the output unit 16 of the game terminal 100, whereby the processing with an item is accepted. The processing with an item may be able to be performed anytime during the game, or some limitation, such as the processing being accepted only between turns, may be provided.

When the item selection area 212 on the game image has been selected, the game terminal 100 transmits information indicating start of the item processing to the server 102.

In step S62, a menu image for selecting the processing using an item is generated. When having received the information indicating start of the item processing from the game terminal 100, the server 102 refers to the player character database, and acquires information of the items registered in the player character 30 associated with the user ID of the player. The server 102 generates a menu image including choices that indicate the items according to the acquired information of the items.

As the effects on the game using the item, for example, recovering the remaining HP of the player character 30, an increase in the attack strength or the defense strength of the player character 30, recovering the state of the player character 30, providing the damage to the enemy character 38, a decrease in the attack strength or the defense strength of the enemy character 38, an increase in the number of turns, and the like. The effects on the game using the item are not limited thereto, and an effect on the game that is provided when "item" or the like is used in a typical role-playing game is applicable.

The effect on the game using the item is registered in the item database. The item database registers the item and the effect on the game using the item, as illustrated in the registration example of FIG. 21.

The server 102 generates item menu image data including choices of the items. Note that, if the item is not registered with respect to the player character 30 in the player character database, the server 102 generates the item menu image data that indicates the player character 30 does not hold the item. The server 102 transmits the generated item menu image data to the game terminal 100.

For example, the server 102 generates the item menu image data for displaying an item menu image 230 as illustrated in FIG. 22. The example of FIG. 22 includes a choice of an item "recovery agent" that indicates recovering of the remaining HP of the player character 30 and a choice of an item "bomb" that indicates providing of damage to the enemy character 38.

In step S64, processing of selecting the choice that indicates the item is performed. The game terminal 100 receives the item menu image data from the server 102, and displays the item menu image 230 in the output unit 16. Further, the game terminal 100 receives selection of the choice included in the item menu image 230 by the player using the input unit 14. The game terminal 100 transmits the selected choice to the server 102.

For example, when the item menu image 230 as illustrated in FIG. 22 is displayed, the player can select one of the choices of "recovery agent" and "bomb".

In step S66, processing of providing the effect on the game according to the selected choice is performed. The server 102 receives information of the choice from the game terminal 100, and performs processing of providing the effect on the game according to the choice.

For example, when the choice of "recovery agent" has been selected, the server 102 performs processing of recovering the remaining HP of the player character 30 by a predetermined number. In this case, the server 102 refers to the player character database, and increases the remaining HP associated with the user ID of the player by the predetermined number. Further, when the choice of "bomb" has been selected, the server 102 performs processing of providing damage to all of remaining enemy characters 38. In this case, the server 102 refers to the enemy character status database, and subtracts the predetermined number from the HPs of all of registered enemy characters 38.

Note that the way of providing the effect on the game using the item is not limited to these examples, and various effects can be applied.

Further, the server 102 performs processing of deleting the item of the selected choice. That is, the server 102 refers to the player character database and the equipment item database, and deletes the used item of the items associated with the user ID of the player.

Note that the weapon, the protective guard, and the item may be able to be acquired during the game. For example, it may be configured such that a panel such as "treasure box" is displayed on the game image when the enemy character 38 is defeated, and the player selects the panel, whereby a new weapon, protective guard, or item according to the type of the treasure box can be obtained. When having acquired the new weapon, protective guard, or item, the server 102 registers the new weapon, protective guard, or item to the player character database and the equipment item database.

At this time, an obtainable weapon, protective guard, or item may be changed according to the number of selected attack panels 32 when the enemy character 38 is defeated. For example, it is favorable to change the weapon, protective guard, or item that can be stochastically obtained according to the number of selected attack panels 32. As illustrated in FIG. 23, a treasure box database in which an appearing percentage for each type of treasure box is associated with a range of the number of selected attack panels 32 is registered in advance, and the panel of each type of treasure box may just be caused to appear at the percentage determined in the treasure box database according to the number of selected attack panels 32.

Further, the number of treasure boxes to appear may be changed according to the number of defeated enemy characters 38. For example, it is favorable to increase the number of treasure boxes to appear when the number of defeated enemy characters 38 is increased, so as to increase the percentage to acquire the weapon, protective guard, or item.

<Continuous Attack Play>

Figure 24:
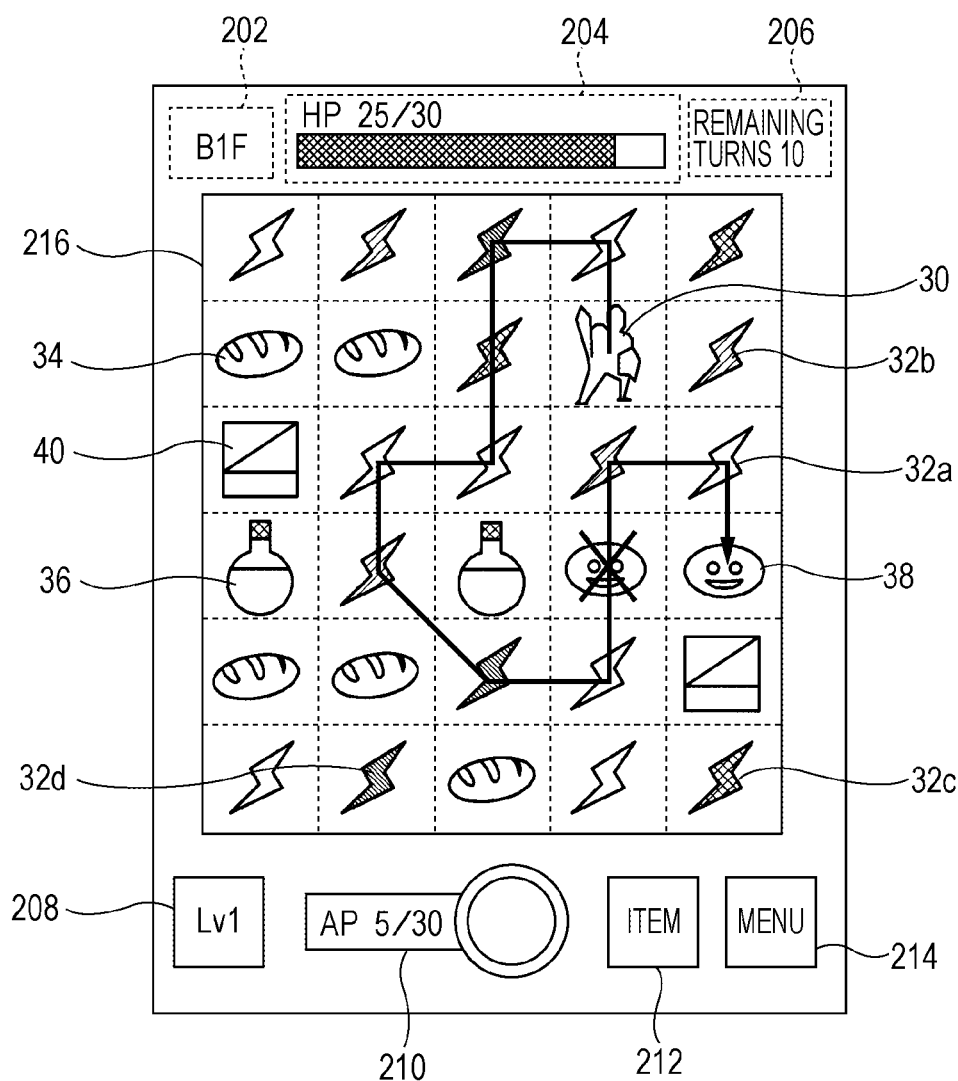
FIG. 24 is a diagram illustrating a selection example of panels in the embodiment of the present invention.

While in step S20, the adjacent panels are traced and continuously selected, the attack panels 32 or another enemy character 38 may be able to be continuously selected through the enemy character 38 under a certain condition, as illustrated in FIG. 24.

For example, it may be configured such that, when the damage to the enemy character 38 by the already selected attack panels 32 exceeds the remaining HP of the enemy character 38, the next attack panel 32 and another enemy character 38 can be continuously selected through the enemy character 38. It is configured such that, if the damage by the attack panels 32 is less than the remaining HP of the enemy character 38, the next attack panel 32 cannot be selected through the enemy character 38.

In this case, the game terminal 100 transmits information of already selected attack panels 32 and the enemy character 38 to the server 102 before confirming the selection processing, and the server 102 calculates whether the damage exceeds the remaining HP of the enemy character 38 by the already selected attack panels 32, similarly to the processing of step S22, and returns a result to the game terminal 100. In the game terminal 100, if the damage by the already selected attack panels 32 is the remaining HP of the enemy character 38 or more, the game terminal 100 continuously accepts selection of the next attack panel 32 and the enemy character 38. If not, the game terminal 100 does not accept the selection of the next attack panel 32 and the enemy character 38

Note that, when through the enemy character 38, the attribute of an attack immediately after the selection may be the no-attribute or may take over the attribute of previously selected attack panel 32.

Further, the attack panels 32 and another enemy character 38 may be able to be further continuously selected through the enemy character 38 according to the type or job of the player character 30, the game stage, the type of the equipped weapon, protective guard, or item. Note that the condition of continuous selection of the attack panel 32 or another enemy character 38 through the enemy character 38 is not limited to the above, and other conditions may be applied.

With such processing, the player can attack a plurality of enemy characters 38 in one turn, and the strategic characteristics of the game, such as selecting of the attack panels 32 with an effective route against the plurality of enemy characters 38, can be increased, while considering the attack strength of the player character 30, the remaining HP of the enemy character 38, the number of remaining turns, and the like.

<Type and Characteristic (Job) of Player Character>

The type and the characteristic (job) of the player character 30 may be able to be selected. The ability values (HP, attack strength, and defense strength), the weapon or protective guard that can be equipped, and the effect on the game (special effect) that can be exerted are changed according to the type and the job of the player character 30, whereby the strategic characteristic of selecting the type and the job of the player character 30 is increased, and the enjoyment of the game can be improved.

For example, attack characteristics or movement characteristics of the player character 30 may be changed according to the type and the job of the player character 30. As the attack characteristics, for example, it can be considered to change a condition, such as an available range of making an attack on the enemy character 38 (an attack range of one panel, two panels, or the like), or a condition of when selecting the enemy character 38 (continuous attack play is not available, continuous attack play is available even if the damage does not exceed the HP of the enemy character 38, or the like). Further, an example of the movement characteristics includes a condition of selection of the panels (only the vertically/horizontally adjacent panels of the same type are selectable, only the diagonally adjacent panels of the same type are selectable, the panels of different types are selectable, or the like).

Further, processing of putting an advantage or a disadvantage to a specific type or job of the player character 30 may be performed according to the game stage (the type of the dungeon, or the floor number). For example, an area such as water or a poisonous pond is provided according to a stage, and only a specific type or job of the player character 30 may be able to pass through the area.

The type and the job of the player character 30 may be able to be arbitrarily changed, or may be able to be changed when the game proceeds to a certain level or when a new weapon is acquired. Further, the type and the job of the player character 30 may be able to be changed only at the time of starting the game or a stage. When the player character 30 is changed, the server 102 refers to the player character database, and updates the type and the job of the player character 30 associated with the user ID of the player.

As described above, a different characteristic is provided for each type and job of the player character 30, whereby the strategic characteristic of performing a different operation for each type and job of the player character 30 is increased, and the enjoyment of the game can be improved. Further, the incentive of the player to play the game with different types and jobs of the player characters 30 can be increased.

<Time System>

In the present embodiment, the game is over when the number of remaining turns becomes 0. However, a time limit is provided in place of or in addition to the number of turns, and the game may be made over when the player cannot defeat all of the enemy characters 38 within the time limit.

In the above embodiment, the case of transmitting the input information to the server every time the input of the user is provided, and the case of receiving the game image data every time performing the display processing of the game image have been described. However, the embodiment is not limited to the examples, and the communication between the game terminal 100 and the server 102 can be performed based on predetermined timing. For example, the game image data is generated at the game terminal side based on the program stored in the storage unit 12 of the game terminal 100, and information about the input of the player or a result of the input is stored in the storage unit 12 of the game terminal 100. The status and the result of the game can be transmitted to the server every certain time or at timing when the stage is cleared, or the like.

What is claimed is:

1. A server device comprising:
a game image generation unit configured to:
generate a game image including a player character and a grid of panels, the grid of panels including a plurality of attack panels,
in each turn, receive an input continuously selecting a path through one or more selected panels among the grid of panels, the path starting from a panel occupied by the player character and intersecting a panel occupied by an enemy character, and
cause damage to the enemy character according to a number of attack panels in the selected panels,
wherein the processing unit is further configured to generate the enemy character,
wherein each of the panels and the enemy character are associated with an attribute, and
wherein the damage to the enemy character is caused according to a relationship between the attributes of the selected panels and the attribute of the enemy character.

2. The server device according to claim 1, wherein the enemy character is a first enemy character, and
wherein the processing unit is further configured to, when a predetermined condition is satisfied, generate a second enemy character, the path intersecting a panel occupied by the second enemy character after the path intersects the first enemy character, and to cause damage to the second enemy character.

3. The server device according to claim 1, wherein the grid of panels includes one or more recovery panels and one or more magic panels, and
wherein the processing unit is further configured to recover hit points of the player character according to the number of recovery panels in the path, and to increase ability points of the player character according to the number of magic panels in the path.

4. The server device according to claim 1, wherein a proportion of attack panels in the grid of panels is based on a current game stage.

5. An electronic game device comprising:
a display unit configured to display a game image including a player character and a grid of panels, the grid of panels including a plurality of attack panels; and
an input unit configured to receive, in each turn, an input continuously selecting a path through one or more selected panels among the grid of panels, the path starting from a panel occupied by the player character and passing through a panel occupied by an enemy character, and
wherein damage is caused to the enemy character according to a number of attack panels in the path,
wherein the display unit displays the enemy character in the game image,
wherein each of the grid of panels and the enemy character is associated with an attribute, and
wherein the damage is provided to the enemy character according to a relationship between the attributes of the selected panels and the attribute of the enemy character.

6. The electronic game device according to claim 5, wherein the enemy character is a first enemy character, and
wherein, when a predetermined condition is satisfied, the path intersects a panel occupied by the second enemy character after intersecting the panel occupied by the first enemy character and damage is caused to the second enemy character.

7. The electronic game device according to claim 5, wherein the grid of panels includes one or more recovery panels and one or more magic panels, and
wherein hit points of the player character are recovered according to the number of recovery panels in the path, and ability points of the player character are increased according to the number of magic panels in the path.

8. The electronic game device according to claim 5, wherein a proportion of attack panels in the grid of panels is based on a current game stage.

9. A non-transitory computer-readable storage medium storing an electronic game program for causing a computer to function as:
a display unit configured to display a game image including a player character and a grid of panels, the grid of panels including a plurality of attack panels;
an input unit configured to receive, in each turn, an input continuously selecting a path through one or more selected panels among the grid of panels, the path being in at least one of a vertical direction, a horizontal direction, and a diagonal direction, the path starting from a panel occupied by the player character and intersecting a panel occupied by an enemy character; and
an effect providing unit configured to cause damage to the enemy character according to the number of attack panels in the path,
wherein the display unit displays the enemy character in the game image,
wherein each of the grid of panels and the enemy character is associated with an attribute, and
wherein the damage is provided to the enemy character according to a relationship between the attributes of the selected panels and the attribute of the enemy character.

10. The non-transitory computer-readable storage medium of claim 9, wherein the grid of panels includes one or more recovery panels and one or more magic panels, and
wherein the effect providing unit is further configured to recover hit points of the player character according to the number of recovery panels in the path, and to increase ability points of the player character according to the number of magic panels in the path.

11. The non-transitory computer-readable storage medium of claim 9, wherein a proportion of attack panels in the grid of panels is based on a current game stage.

* * * * *